United States Patent
Loh et al.

(10) Patent No.: US 7,021,833 B2
(45) Date of Patent: Apr. 4, 2006

(54) WAVEGUIDE BASED OPTICAL COUPLING OF A FIBER OPTIC CABLE AND AN OPTOELECTRONIC DEVICE

(76) Inventors: Ban-Poh Loh, 823 Cape Town Pl., San Jose, CA (US) 95133; James Chang, 901 Cottonwood Dr., Cupertino, CA (US) 95014; Pradeep Raj Komar, 4150 Normondale Dr., San Jose, CA (US) 95118; Brenton A. Baugh, 1504 Madrono Ave., Palo Alto, CA (US) 94306; Ronald T. Kaneshiro, 271 Live Oak La., Los Altos, CA (US) 94022; Robert E. Wilson, 2585 Louis Rd., Palo Alto, CA (US) 94303; James Williams, 4256 Ruthelma Ave., Palo Alto, CA (US) 94306

( * ) Notice: Subject to any disclaimer, the term of this patent is extended or adjusted under 35 U.S.C. 154(b) by 366 days.

(21) Appl. No.: 10/104,249

(22) Filed: Mar. 22, 2002

(65) Prior Publication Data
US 2003/0180006 A1   Sep. 25, 2003

(51) Int. Cl.
*G02B 6/36* (2006.01)

(52) U.S. Cl. .............. 385/88; 385/92; 385/94
(58) Field of Classification Search ............ 385/88–94, 385/2, 8, 53, 54, 114, 115, 116
See application file for complete search history.

(56) References Cited

U.S. PATENT DOCUMENTS

| | | | | |
|---|---|---|---|---|
| 5,127,075 A | * | 6/1992 | Althaus et al. | 385/94 |
| 5,347,605 A | * | 9/1994 | Isaksson | 385/92 |
| 5,515,468 A | * | 5/1996 | DeAndrea et al. | 385/88 |
| 5,708,745 A | | 1/1998 | Yamaji et al. | |
| 5,892,872 A | * | 4/1999 | Glover | 385/94 |
| 6,282,350 B1 | * | 8/2001 | Takahashi et al. | 385/88 |
| 6,457,877 B1 | * | 10/2002 | Kato et al. | 385/92 |

FOREIGN PATENT DOCUMENTS

| | | |
|---|---|---|
| EP | 0393829 | 10/1990 |
| EP | 0404053 | 12/1990 |
| EP | 0689071 | 12/1995 |

* cited by examiner

*Primary Examiner*—Daniel Stcyr
*Assistant Examiner*—Daniel A. Hess

(57) ABSTRACT

Waveguide based connector systems for optically coupling a fiber optic cable and an optoelectronic device and a method of fabricating the same are described. In one aspect, a connector system comprises an optical waveguide and an optical turn assembly. The optical waveguide has a first end and a second end. The first end of the optical waveguide is connectable to the fiber optic cable in an orientation aligned with a line-side connection axis. The optical turn assembly has a first optical port that is connected to the second end of the optical waveguide in an orientation aligned with a device-side connection axis, a second optical port that is oriented to communicate optically with the optoelectronic device along a device communication axis substantially intersecting the device-side connection axis, and an optical turn system that is operable to guide light along a path between the first optical port and the second optical port.

23 Claims, 4 Drawing Sheets

US 7,021,833 B2

WAVEGUIDE BASED OPTICAL COUPLING OF A FIBER OPTIC CABLE AND AN OPTOELECTRONIC DEVICE

TECHNICAL FIELD

This invention relates to waveguide based systems and methods of optically coupling a fiber optic cable and an optoelectronic device.

BACKGROUND

Fiber optic connectors couple optical communication channels (e.g., optical fibers) to one or more optical devices (e.g., electro-optic and opto-electric devices). The optical communication channels may be defined by a bundle of glass or plastic fibers (a "fiber optic cable"), each of which is capable of transmitting data independently of the other fibers. Relative to traditional metal connections, optical fibers have a much greater bandwidth, they are less susceptible to interference, and they are much thinner and lighter. Because of these advantageous physical and data transmission properties, efforts have been made to integrate fiber optics into electronic system designs. For example, in a local area network, fiber optics may be used to connect a plurality of local computers to centralized equipment, such as servers and printers. In this arrangement, each local computer has one or more optoelectronic devices (e.g., an optical receiver, an optical transmitter, or an optical transceiver) for transmitting optical information or receiving optical information, or both. An optoelectronic device may be mounted on a printed circuit board that supports one or more integrated circuits. Typically, each computer includes several printed circuit boards that are plugged into the sockets of a common backplane. The backplane may be active (i.e., it includes logic circuitry for performing computing functions) or it may be passive (i.e., it does not include any logic circuitry). An external network fiber optic cable may be connected to the optical transceiver through a fiber optic connector that is coupled to the backplane.

In general, the trend in the electronic equipment industry is to pack an ever increasing amount of functionality into an ever shrinking form factor. To this end, electronic equipment, such as computers, diagnostic devices and analytical devices, typically include numerous printed circuit boards stacked in a high density, parallel arrangement. In order to incorporate optical transmission devices into such densely packed, parallel arrangements, the fiber optic cables typically must be introduced into the electronic system in an orientation that is substantially parallel to the printed circuit boards to which the fiber optic cables are to be connected.

A wide variety of different approaches for coupling a fiber optic cable to an optoelectronic device that is mounted on a printed circuit board have been proposed. For example, in one approach, the optoelectronic device is mounted orthogonally to the surface of the printed circuit board so that the optically active surface of the device intersects the light transmission axis of the fiber optic cable. In another approach, the optoelectronic device is mounted parallel to the printed circuit board surface and individual optical fibers couple the channels of the fiber optic cable to the optoelectronic device over an arcuate light transmission path of 90° (see, e.g., U.S. Pat. No. 4,553,813). In still another approach, U.S. Pat. No. 5,515,468 has proposed a connector for directly coupling a fiber optic transmission line and an opto-electronic device that is oriented substantially parallel to a printed circuit board substrate. In this approach, an optical component that includes, for example, a reflective surface and possibly one or more optical lenses, is positioned to direcly contact the fiber optic transmission line and direct light over a 90° arcuate light transmission path between the optoelectronic device and the fiber optic transmission line.

SUMMARY

The invention features waveguide based connector systems for optically coupling a fiber optic cable and an optoelectronic device, and a method of fabricating the same. The waveguide based optical connector system includes an optical waveguide and an optical turn assembly that couples light to an optoelectronic device. The optical waveguide provides optoelectronic module designers the freedom to position the optical turn assembly at virtually any convenient location within an optoelectronic module with no light loss and, thereby, enables more efficient optoelectronic module designs. The optical waveguide also separates the precision-aligned optical components of the optical turn assembly from the physical interface of the optoelectronic module and, thereby, reduces the risk that physical shock to the module (e.g., torque produced by improper or unintentional force applied to a physical connector) would damage or degrade the precision-aligned optical components.

In one aspect, the invention features a connector system for optically coupling a fiber optic cable and an optoelectronic device mounted on a substantially planar interconnection substrate in an orientation that is substantially parallel to the substantially planar interconnection substrate. The connector system comprises an optical waveguide and an optical turn assembly. The optical waveguide has a first end and a second end. The first end of the optical waveguide is connectable to the fiber optic cable in an orientation that is aligned with a line-side connection axis. The optical turn assembly has a first optical port that is connected to the second end of the optical waveguide in an orientation that is aligned with a device-side connection axis, a second optical port that is oriented to communicate optically with the optoelectronic device along a device communication axis substantially intersecting the device-side connection axis, and an optical turn system that is operable to guide light along a path between the first optical port and the second optical port.

Embodiments of the invention may include one or more of the following features.

The optical turn system preferably comprises a reflective surface that is oriented to re-direct light received from one optical port to the other optical port. In some embodiments, the reflective surface is oriented at an angle of approximately 45° with respect to the device-side connection axis and the device communication axis. The optical turn system may further comprise a collimating element that is positioned at the second optical port. The optical turn system also may further comprise a focusing element that is positioned at the first optical port.

In some embodiments, the optical turn assembly comprises a V-grooved surface supporting light transmission elements of the optical waveguide. In these embodiments, the optical waveguide comprises multiple optical fibers each disposed in a respective V-shaped groove of the V-grooved support surface. The optical fibers of the optical waveguide may be held in aligned abutment against the reflective surface.

The optical turn assembly may comprise a housing with a cavity that is sized and arranged to receive the optoelectronic device and is configured to be mounted on the substantially planar interconnection substrate over the optoelectronic device in alignment with the second optical port of the optical turn system.

In some embodiments, the connector system may further comprise an optical connector that is oriented along the line-side connection axis substantially parallel to the substantially planar interconnection substrate and is operable to connect the first end of the optical waveguide to the fiber optic cable. In these embodiments, the optical turn assembly may be operable to guide light through a 90° turn between the first optical port and the second optical port. The optical waveguide may comprise a plug at the first end and the optical connector may comprise a socket for receiving and aligning the optical waveguide plug with respect to the fiber optic cable. In some embodiments, the optical connector and the first optical port of the optical turn assembly are substantially coplanar. In other embodiments, the optical connector and the first optical port of the optical turn assembly are oriented in respective non-coplanar parallel planes. In these embodiments, an intermediate portion of the optical waveguide between the first and second ends preferably is sufficiently flexible to accommodate the non-coplanarity of the optical connector and the first optical port of the optical turn assembly.

In another aspect, the invention features a method of fabricating the above-described waveguide based optical connector system.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
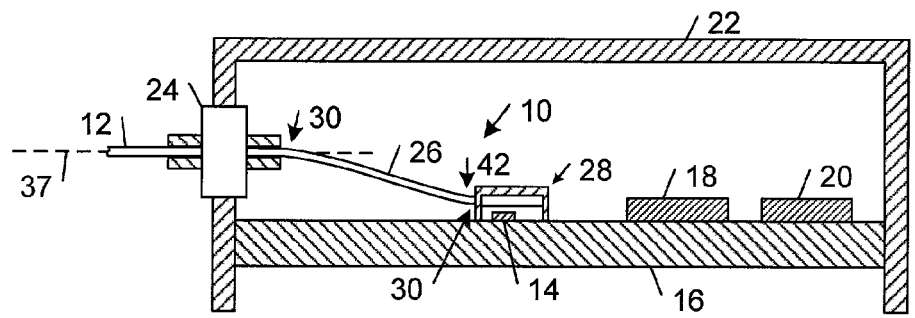
FIG. 1 is a diagrammatic cross-sectional side view of a fiber optic cable coupled by a waveguide based optical coupling system to an optoelectronic device that is mounted on a substantially planar interconnection substrate of an optoelectronics module.

Referring to FIG. 1, in one embodiment, a waveguide based optical coupling system 10 is configured to optically couple a fiber optic cable 12 and an optoelectronic device 14 that is mounted on a substantially planar interconnection substrate 16 in an orientation that is substantially parallel to the substantially planar interconnection substrate 16. Optoelectronic device 14 may be implemented in the form of any one of a wide variety of different optoelectronic devices, including a fiber optic transmitter, a fiber optic receiver, and a fiber optic transceiver. The term "interconnection substrate" broadly refers to a substrate on which one or more electronic components (e.g., chips or integrated circuits) may be supported. Interconnection substrate 16 may be implemented as a conventional printed circuit board or printed wiring board and may include one or more electronic circuits 18, 20 (e.g., a pre-amplifier circuit and a post-amplifier circuit) in addition to optoelectronic device 14. Examples of printed circuit boards include motherboards, expansion boards, daughter-boards (or circuit cards), controller boards, network interface cards, input/output cards and adapter cards (e.g., video and audio adapter cards). The waveguide based optical coupling system 10, optoelectronic device 14, and interconnection substrate are contained within a housing 22. Housing 22 may be configured to be mounted directly to a motherboard or other system board of an electronic system (e.g., a computer or a peripheral device). Alternatively, housing 22 may be implemented in the form of a transceiver module that may be plugged into a transceiver receptacle that extends, for example, out of a rear panel of an electronic system and connects the transceiver module to a motherboard or circuit card in the electronic system.

Figure 2A:
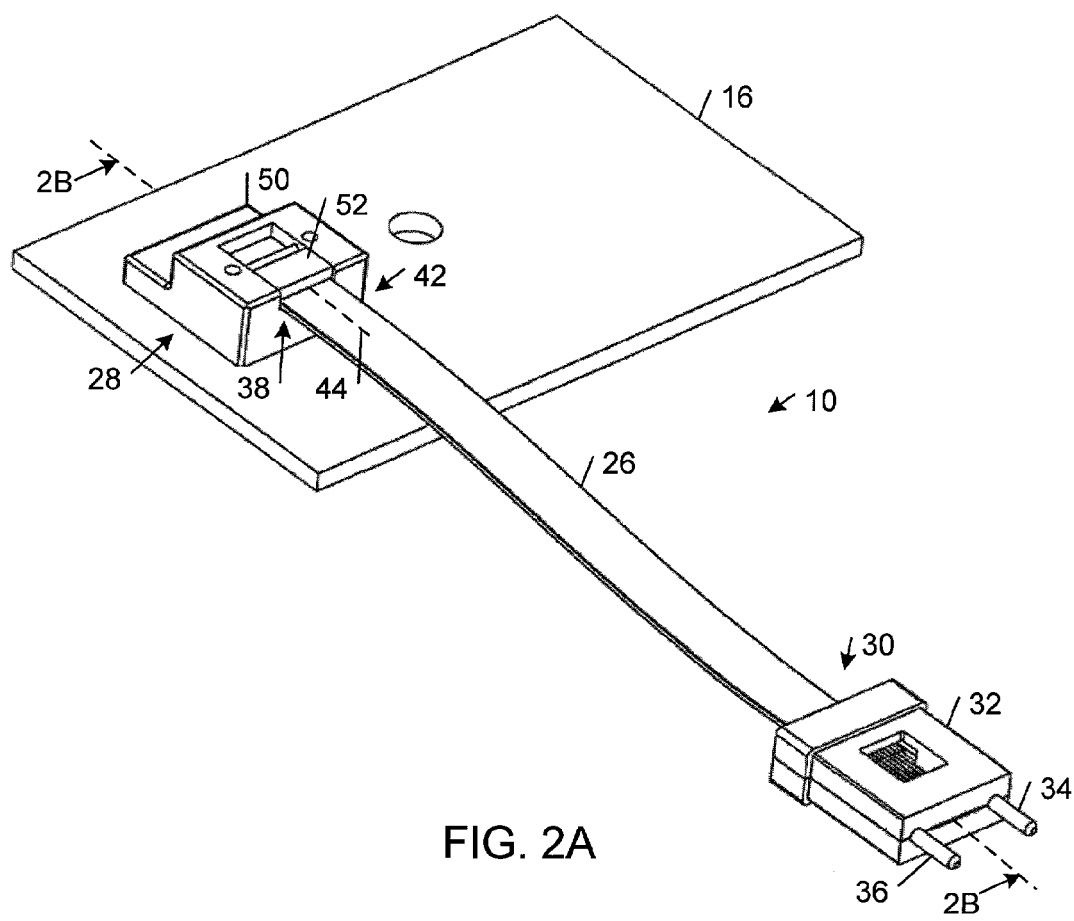
FIG. 2A is a diagrammatic perspective view of the waveguide based optical coupling system of FIG. 1 mounted to the substantially planar interconnection substrate in alignment with the optoelectronic device.
Figure 2B:
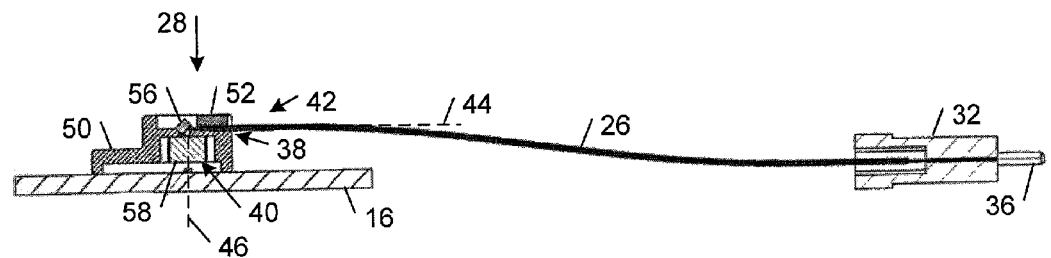
FIG. 2B is a diagrammatic cross-sectional side view of the waveguide based optical coupling system of FIG. 2A taken along the line 2B—2B.

As shown in FIGS. 1, 2A and 2B, waveguide based optical coupling system 10 includes an optical connector 24, an optical waveguide 26, and an optical turn assembly 28. Optical waveguide 26 may be implemented in the form of any single mode or multi-mode structure that guides light along its length, including a bundle of one or more optical fibers, and a planar waveguide. In the illustrated embodiment, optical waveguide 26 is implemented as a flexible, multi-fiber tight buffered ribbon cable. In the illustrated embodiment, waveguide 26 includes at a line-side end 30 a plug 32 with a pair of alignment pins 34, 36 that are configured to mate with a pair of corresponding pin holes (or bores) in optical connector 24. In this way, optical connector 24 is configured to connect fiber optic cable 12 to the line-side end 30 of optical waveguide 26 in an orientation aligned along a line-side connection axis 37 that is substantially parallel to the interconnection substrate 16. Optical connector 24, waveguide plug 30, and the corresponding connector at the end of fiber optic cable 12 may conform to any one of a variety of optical interface standards, including LC-type, HSSDC2-type, RJ-type, SC-type, SG-type, ST-type, FDDI-type, FC-type, D4-type and Biconic-type connectors.

Optical turn assembly 28 includes a first optical port 38 and a second optical port 40. First optical port 38 is connected to a device-side end 42 of optical waveguide 26 in an orientation that is aligned with a device-side connection axis 44. Second optical port 40 is oriented to communicate with optoelectronic device 14 along a device communication axis 46 that substantially intersects the device-side communication axis 44. Optical turn assembly 28 also includes an optical turn system that is operable to guide light along a path between the first optical port 38 and the second optical port 40. In the illustrated embodiment, device communication axis 46 is oriented substantially normal to the substantially planar interconnection substrate 16 so that second optical port 140 is aligned with the active surface (or active area) of optoelectronic device 14. In embodiments in which the active surface of optoelectronic device 14 produces (or is responsive to) a divergent light beam, second optical port 40 preferably is aligned with the average light beam direction. For example, a vertical cavity surface emitting laser (VCSEL) emits laser light from the top surface of a light-emitting cavity with a relatively small beam divergence (e.g., on the order of 10°). In these embodiments, the second optical port 40 may be aligned with the central portion of the divergent light beam (e.g., on the order of 5° from the beam periphery). In the illustrated embodiment, the device-side connection axis 44 is oriented substantially parallel to the substantially planar interconnection substrate 16. In this embodiment, optical turn assembly 28 is operable to guide light through a 90° turn between the first optical port 38 and the second optical port 40. In general, the device-side connection axis 44 and the device communication axis 46 may be oriented at any one of a wide variety of different angles with respect to each other. The angle between the device-side connection axis 44 and the device communication axis 46 preferably is between about 45° and about 135° and, more preferably, is on the order of 90°.

Figure 3A:
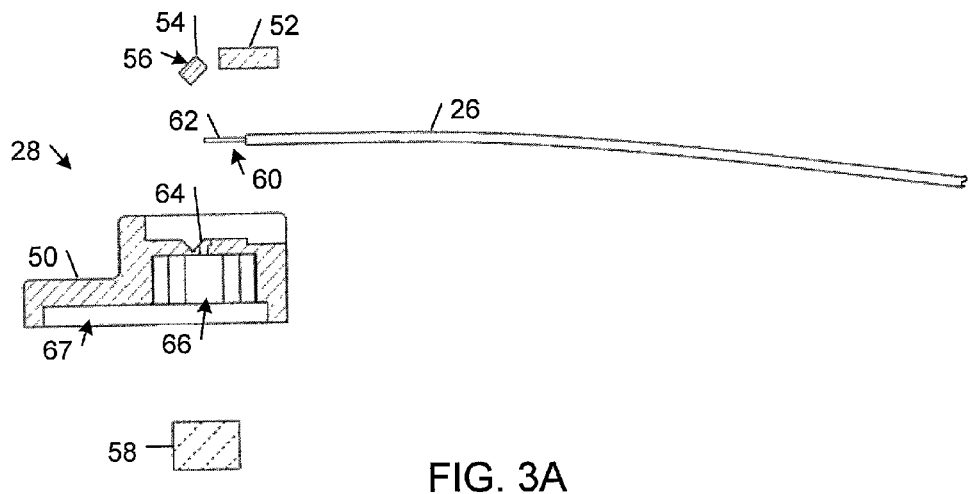
FIG. 3A is a diagrammatic cross-sectional side view of a device-side portion of the waveguide based optical coupling system of FIG. 1, with the components disassembled.
Figure 3B:
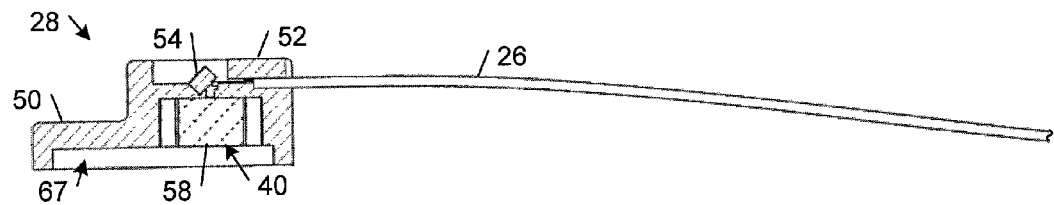
FIG. 3B is a diagrammatic cross-sectional side view of the device-side portion of the waveguide based optical coupling system shown in FIG. 3A, with the components reassembled.

Referring to FIGS. 3A and 3B, in one embodiment, optical turn assembly 28 includes a housing 50, a surface plate 52, and an optical turn system that includes an optical component 54 with a reflective surface 56 and an optical lens 58. Housing 50 and surface plate 52 may be formed from a precision-molded plastic material or a metal. Housing 50 includes a V-shaped groove 64 that is configured to support optical component 54 with the reflective surface 56 oriented at a 45° angle with respect to the device-side connection axis 44. Housing 50 also includes a recess 66 that is configured to hold optical lens 58 in alignment with respect to device communication axis 46, and a cavity 67 that is sized and arranged to receive optoelectronic device 14. In general, each of optical component 54 and optical lens 58 may be implemented as any one of a wide variety of different passive optical components. For example, optical component 54 may be implemented as a mirror or a total internal reflection prism, and optical lens 58 may be implemented as a conventional collimating lens configured to collimate, for example, a divergent light beam received from optoelectronic component 14. In some embodiments, optical component 54 and optical lens 58 may be incorporated into a single unitary structure that is configured to perform the necessary light-turning and collimating (or focusing) functions.

Figure 4:
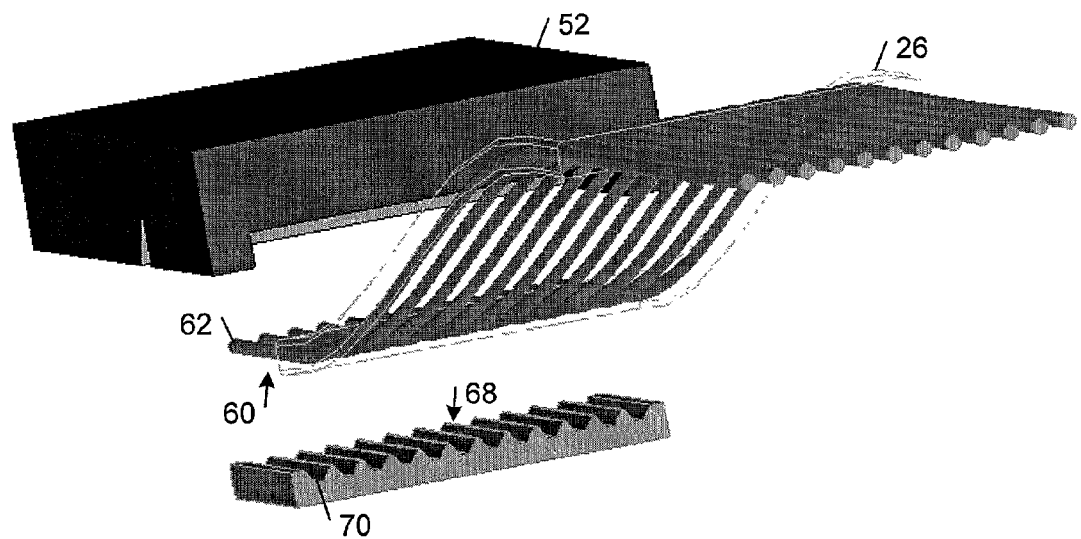
FIG. 4 is a diagrammatic perspective view of a V-grooved support structure configured to hold optical fibers of an optical waveguide in alignment in an optical turn assembly located at a device-side portion of the waveguide based optical coupling system of FIG. 1.

Referring to FIGS. 3B and 4, surface plate 52 is configured to hold in place with respect to housing 50 optical component 54 and the exposed ends 60 of the constituent light transmission elements 62 (e.g., optical fibers) of optical waveguide 26. In the illustrated embodiment, surface plate 52 is configured to hold the exposed ends 60 of light transmission elements 62 in aligned abutment against optical component 54. In particular, as shown in FIG. 4, housing 50 includes a V-grooved surface 68 with individual grooves 70 that are aligned with the device-side connection axis 44 and are configured to hold a respective one of the exposed ends 60 of light transmission elements 62. In other embodiments, a focusing lens may be positioned between optical component 54 and the exposed ends 60 of light transmission elements 62.

Figure 5A:
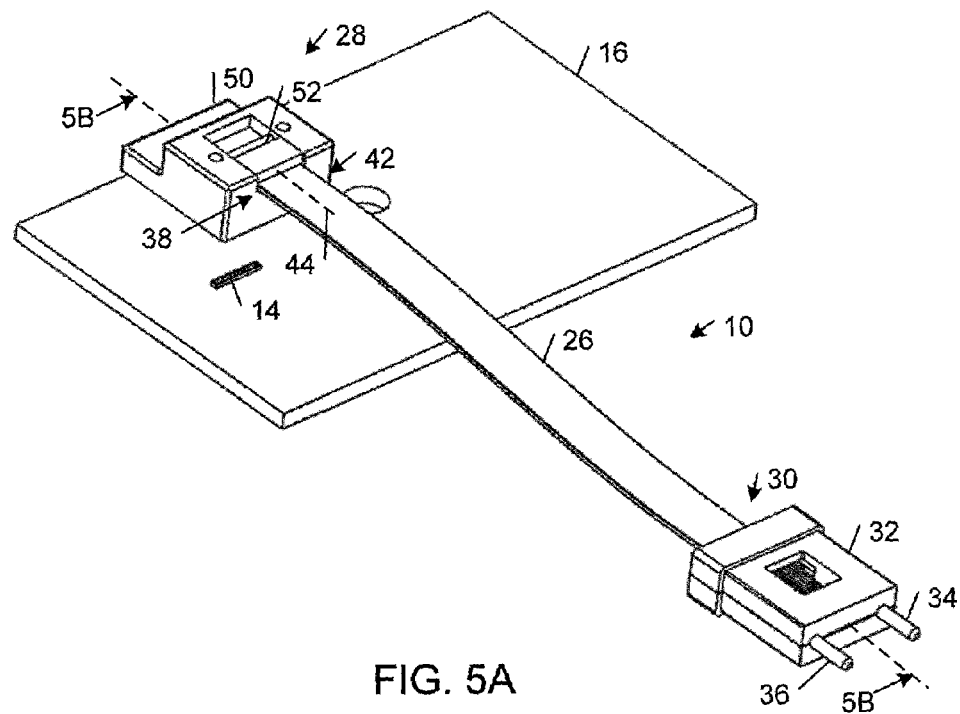
FIG. 5A is a diagrammatic perspective view of the waveguide based optical coupling system of FIG. 1 with a device-side optical turn assembly housing disposed in alignment above an optoelectronic device that is mounted on a substantially planar interconnection substrate.
Figure 5B:
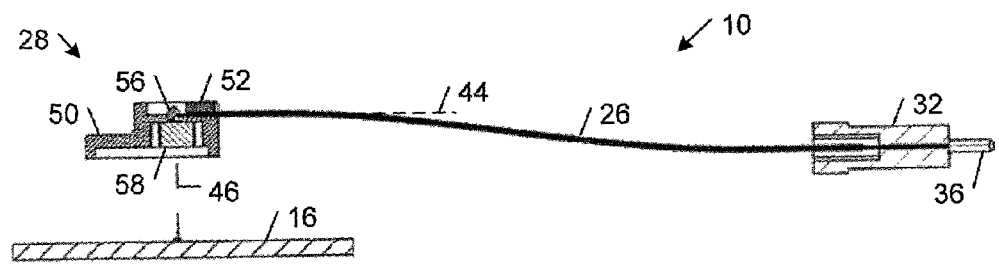
FIG. 5B is a diagrammatic cross-sectional side view of the waveguide based optical coupling system shown in FIG. 5A taken along the line 5B—5B.

Referring to FIGS. 5A and 5B, after the waveguide based optical coupling system 10 has been fabricated, housing 50 may be positioned so that the second optical port 40 is aligned with the device communication axis 46. Second optical port 40 may be aligned with optoelectronic device 14 using conventional active alignment techniques. After the second optical port 40 has been aligned, housing 50 may be mounted on the substantially planar interconnection substrate 16 over optoelectronic device 14. Housing 50 may be mounted to interconnection substrate 16 in a conventional way. For example, the components (e.g., optoelectronic device 14 and integrated circuits 18, 20) that are supported interconnection substrate 16 may be housed in respective ball grid array (BGA) packages that include die carriers with bottom surfaces supporting a plurality of solder balls (or bumps) that connect to contacts on the substantially planar interconnection substrate surface. The BGA packages may include an over molded pad array carrier or a ceramic substrate material that houses the printed circuit board components. In alternative embodiments, the interconnection substrate components may be mounted using surface mount technology (SMT) or other mounting technique, such as, bore soldering ("pin through-hole") technology or flip-chip technology. In other embodiments, optoelectronic device 14 and integrated circuits 18, 20 may be mounted on a two-sided interconnection substrate rather than a single-sided interconnection substrate.

Other embodiments are within the scope of the claims.

Figure 6:
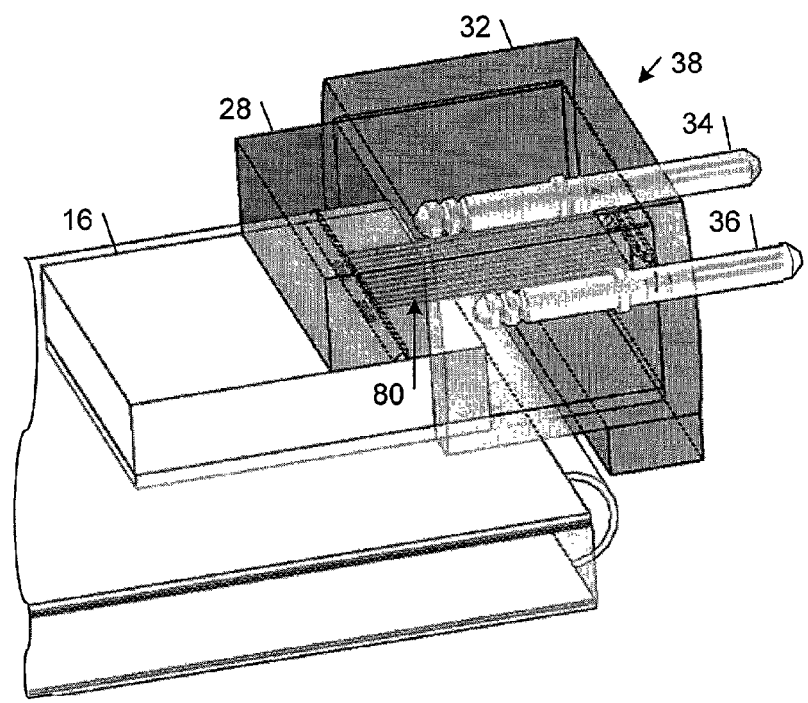
FIG. 6 is a diagrammatic perspective view of an alternative waveguide based optical coupling system in which an optical connector is substantially coplanar with an optical port of an optical turn assembly.

For example, as shown in FIG. 6, in one embodiment, a fiber optic cable may be optically coupled to the optical turn assembly 28 with a substantially rigid optical waveguide 80, rather than the flexible optical waveguide 26 used in the embodiments described above. In this embodiment, the first optical port 38 of optical turn assembly 28 is substantially coplanar with respect to the optical connector 24 after the waveguide based optical coupling system has been installed. In this way, optical waveguide 80 may extend substantially in a plane, thereby reducing any optical transmission loss that otherwise might occur as a result of, for example, bending of the constituent light transmission elements of optical waveguide 80.

Still other embodiments are within the scope of the claims.

What is claimed is:

1. A connector system for optically coupling a fiber optic cable and an optoelectronic device mounted on a substantially planar interconnection substrate in an orientation substantially parallel to the substantially planar interconnection substrate, comprising:

an optical waveguide having a first end and a second end, the first end being connectable to the fiber optic cable in an orientation aligned with a line-side connection axis;

an optical turn assembly having a first optical port connected to the second end of the optical waveguide in an orientation aligned with a device-side connection axis, a second optical port oriented to communicate optically with the optoelectronic device along a device communication axis substantially intersecting the device-side connection axis, and an optical turn system operable to guide light along a path between the first optical port and the second optical port; and a housing containing the optical waveguide and the optical turn assembly, wherein the optical connector is attached to a wall of the housing and has an exterior connector portion on anexterior of the housing configured to be selectively connected to and disconnected from the fiber optic cable and an interior connector portion on an interior of the housing configured to be selectively connected to and disconnected from the optical waveguide.

2. The connector system of claim 1, wherein the optical turn system comprises a reflective surface oriented to re-direct light received from one optical port to the other optical port.

3. The connector system of claim 2, wherein the reflective surface is oriented at an angle of approximately 45° with respect to the device-side connection axis and the device communication axis.

4. The connector system of claim 2, wherein the optical turn system further comprises a collimating element positioned at the second optical port.

5. The connector system of claim 2, wherein the optical turn system further comprises a focusing element positioned at the first optical port.

6. The connector system of claim 1, wherein the optical turn assembly comprises a housing with a cavity sized and arranged to receive the optoelectronic device and configured to be mounted on the substantially planar interconnection substrate over the optoelectronic device in alignment with the second optical port of the optical turn system.

7. The connector system of claim 1, further comprising an optical connector oriented along the line-side connection axis substantially parallel to the substantially planar interconnection substrate and operable to connect the first end of the optical waveguide to the fiber optic cable.

8. The connector system of claim 7, wherein the optical turn assembly is operable to guide light through a 90° turn between the first optical port and the second optical port.

9. The connector system of claim 7, wherein the optical waveguide comprises a plug at the first end and the optical connector comprises a socket for receiving and aligning the optical waveguide plug with respect to the fiber optic cable.

10. The connector system of claim 7, wherein the optical connector and the first optical port of the optical turn assembly are substantially coplanar.

11. The connector system of claim 7, wherein the optical connector and the first optical port of the optical turn assembly are oriented in respective non-coplanar parallel planes.

12. The connector system of claim 11, wherein an intermediate portion of the optical waveguide between the first and second ends is sufficiently flexible to accommodate the non-coplanarity of the optical connector and the first optical port of the optical turn assembly.

13. A connector system for optically coupling a fiber optic cable and an optoelectronic device mounted on a substantially planar interconnection substrate in an orientation substantially parallel to the substantially planar interconnection substrate, comprising:

an optical waveguide having a first end and a second end, the first end being connectable to the fiber optic cable in an orientation aligned with a line-side connection axis; and an optical turn assembly having a first optical port connected to the second end of the optical waveguide in an orientation aligned with a device-side connection axis, a second optical port oriented to communicate optically with the optoelectronic device along a device communication axis substantially intersecting the device-side connection axis, and an optical turn system operable to guide light along a path between the first optical port and the second optical port, wherein the optical turn assembly comprises a V-grooved surface supporting light transmission elements of the optical waveguide.

14. The connector system of claim 13, wherein the optical waveguide comprises multiple optical fibers each disposed in a respective V-shaped groove of the V-grooved support surface.

15. The connector system of claim 14, wherein the optical fibers of the optical waveguide are held in aligned abutment against the reflective surface.

16. A method of fabricating a connector system for optically coupling a fiber optic cable and an optoelectronic device mounted on a substantially planar interconnection substrate in an orientation substantially parallel to the substantially planar interconnection substrate, comprising:

forming an optical waveguide having a first end and a second end, the first end being connectable to the fiber optic cable in an orientation aligned with a line-side connection axis;

forming an optical turn assembly having a first optical port connected to the second end of the optical waveguide in an orientation aligned with a device-side connection axis, a second optical port oriented to communicate optically with the optoelectronic device along a device communication axis substantially intersecting the device-side connection axis, and an optical turn system operable to guide light along a path between the first optical port and the second optical port; and forming a housing containing the optical waveguide and the optical turn assembly, wherein the optical connector is attached to a wall of the housing and has an exterior connector portion on an exterior of the housing configured to be selectively connected to and disconnected from the fiber optic cable and an interior connector portion on an interior of the housing configured to be selectively connected to and disconnected from the optical waveguide.

17. The method of claim 16, wherein the optical turn system comprises a reflective surface oriented to re-direct light received from one optical port to the other optical port.

18. The method of claim 16, wherein the optical turn assembly comprises a housing with a cavity sized and arranged to receive the optoelectronic device and configured to be mounted on the substantially planar interconnection substrate over the optoelectronic device in alignment with the second optical port of the optical turn system.

19. The method of claim 16, further comprising forming an optical connector oriented along the line-side connection axis substantially parallel to the substantially parallel to the substantially planar interconnection substrate and operable to connect the first end of the optical waveguide to the fiber optic cable.

20. The method of claim 19, wherein the optical connector and the first optical port of the optical turn assembly are substantially coplanar.

21. The method of claim 19, wherein the optical connector and the first optical port of the optical turn assembly are oriented in respective non-coplanar parallel planes.

22. The method of claim 21, wherein an intermediate portion of the optical waveguide between the first and second ends is sufficiently flexible to accommodate the non-coplanarity of the optical connector and the first optical port of the optical turn assembly.

23. A method of fabricating a connector system for optically coupling a fiber optic cable and an optoelectronic device mounted on a substantially planar interconnection substrate in an orientation substantially parallel to the substantially planar interconnection substrate, comprising:

forming an optical waveguide having a first end and a second end, the first end being connectable to the fiber optic cable in an orientation aligned with a line-side connection axis;

forming an optical turn assembly having a first optical port connected to the second end of the optical waveguide in an orientation aligned with a device-side connection axis, a second optical port oriented to communicate optically with the optoelectronic device along a device communication axis substantially intersecting the device-side connection axis, and an optical turn system operable to guide light along a path between the first optical port and the second optical port, wherein the optical turn assembly comprises a V-grooved surface supporting light transmission elements of the optical waveguide.

* * * * *